(12) United States Patent
Dong et al.

(10) Patent No.: US 8,593,941 B2
(45) Date of Patent: Nov. 26, 2013

(54) METHOD FOR IMPLEMENTING PERMANENT RING NETWORK PROTECTION IN AN MESH NETWORK

(75) Inventors: Jun Dong, Shenzhen (CN); Zhenyu Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 335 days.

(21) Appl. No.: 13/063,283

(22) PCT Filed: Jul. 27, 2009

(86) PCT No.: PCT/CN2009/072929
§ 371 (c)(1),
(2), (4) Date: Mar. 29, 2011

(87) PCT Pub. No.: WO2010/028560
PCT Pub. Date: Mar. 18, 2010

(65) Prior Publication Data
US 2011/0176409 A1 Jul. 21, 2011

(30) Foreign Application Priority Data
Sep. 10, 2008 (CN) .......................... 2008 1 0211915

(51) Int. Cl.
*H04L 1/00* (2006.01)
(52) U.S. Cl.
USPC ............................ 370/217; 709/223; 709/224
(58) Field of Classification Search
USPC ...................... 370/216, 221–228, 241, 249
See application file for complete search history.

(56) References Cited

U.S. PATENT DOCUMENTS

| | | | |
|---|---|---|---|
| 2002/0118636 A1 | 8/2002 | Phelps et al. | |
| 2004/0190444 A1* | 9/2004 | Trudel et al. | 370/224 |
| 2005/0188242 A1* | 8/2005 | Rabbat et al. | 714/4 |

FOREIGN PATENT DOCUMENTS

| | | |
|---|---|---|
| CN | 1675901 A | 9/2005 |
| CN | 101094036 A | 12/2007 |
| CN | 101258715 A | 9/2008 |
| EP | 1 146 682 A2 | 10/2001 |
| EP | 1 763 180 A1 | 3/2007 |

OTHER PUBLICATIONS

ITU-T, Study Group 15: "Living list for G.873.2; TD 60 (WP 3/15)", ITU-T Drafts; Study Period 2001-2004, International Telecommunication Union, Geneva; CH, vol. Study Group 15; 9/15, Apr. 19, 2004, pp. 1-10, XP017501617, retrieved on Nov. 12, 2004.

\* cited by examiner

*Primary Examiner* — Charles C Jiang
(74) *Attorney, Agent, or Firm* — McGarry Bair PC

(57) ABSTRACT

A method for implementing permanent ring network protection in an MESH network, the method includes the following steps: a node in a ring network protection group informing, when detecting a certain span fails, other nodes in the ring network protection group of the failure information (11); each node in the ring network protection group switching a service that is affected by the failure to a protection path thereof for transmission (12); searching for a substitute path for the failed span in idle resources of the MESH network (13); establishing a new ring network protection group by using the substitute path and sections that are not affected by the failure in the ring network protection group (14); and switching the service that is affected by the failure from being transmitted via the protection path to being transmitted via the substitute path (15). The present invention is capable of providing the permanent ring network protection function for all the services on the ring network.

5 Claims, 5 Drawing Sheets

METHOD FOR IMPLEMENTING PERMANENT RING NETWORK PROTECTION IN AN MESH NETWORK

CROSS-REFERENCE TO RELATED APPLICATIONS

This application is a National Phase application of International Application No. PCT/CN2009/072929, filed Jul. 27, 2009, which claims the benefit of Chinese Patent Application No. 200810211915.1, filed Sep. 10, 2008, both of which are incorporated herein by reference in their entirety.

FIELD OF THE INVENTION

The present invention relates to the ring network service protection technology of an optical communication network, and in particular to a method for implementing permanent ring network protection in an MESH (reticulate) network.

BACKGROUND OF THE INVENTION

The current optical transport network puts higher and higher demand on the network survivability. The network survivability means ability to still retain service continuity in a case of failure in the network. An APS (Automatic Protection Switching) is important means for implementing the survivability of an optical network.

A ring network protection technology has characteristics of a high utilization ratio of the network resources and a fast protection switching and therefore has been widely applied. The ring network protection may be classified into multiplex section shared ring network protection, channel shared ring network protection and sub-wavelength shared ring network protection, etc. according to different granularities of the protection switching. For instance, G.841 of International Telecommunications Union ITU-T sets forth the principle of the multiplex section shared ring network protection of SDH (Synchronous Digital Hierarchy). The principle is: after a certain span fails in the ring network, a new ring is formed by performing a double-end switching at nodes adjacent to both ends of the failed span, so as to implement the protection function to the service. In addition, Patent of CN13131955 with the title of "Implementing Method of Protection Switching Protocol Supporting Channel Sharing Ring Protection" provides a method for realizing switching protection protocol supporting channel shared ring network protection. In the method, on the basis of three types of node states, which are an idle state IDLE, a pass-through state PASS and a switching state SWITCH, stipulated in G.841 protocol of ITU-T, three types of channel protection states being introduced, which are a channel switching state CSWITCH, a channel pass-through state CPASS and a channel idle state CIDLE; determining firstly state of each node according to the ITU-T protocol when a failure occurs; and then, judging by each node whether a protected service is affected by the failure according to the node state, protected service information and a network topological structure, so as to further determine the channel protection state, to perform protection switching action at add and drop nodes of the service, so that the protection function is implemented to the damaged service.

Regardless of the multiplex section shared ring network protection, the channel shared ring network protection and the sub-wavelength shared ring network protection, since the ring network protection structure is determined during network planning and cannot be dynamically adjusted according to the network failure state, when a plurality of spans are failed in the ring network, the services passing through the failed spans will be interrupted and other services on the ring network will also lose the protection function at the same time. It will be explained with two specific examples in the following.

FIG. 1 is a schematic diagram of one specific example of the multiplex section shared ring network protection in the prior art. The multiplex section shared ring network protection group shown in the figure consists of eight nodes, marked as A, B . . . H, respectively. A pair of services present between the node H and the node F, and a pair of services present between the node F and the node E. After a span 4 fails, the services between the node H and the node F are transmitted via a protection path thereof (the broken line in the figure represents the protection path of the services), i.e., going through the node H, the node G, the node H, the node A . . . until the node F, while the services between the node F and the node E will not be affected. However, after a span 5 also fails, since both the working path and the protection path of the two services above fail, these two services cannot be protected but in a state of interrupted service, and all the other services on the ring network will lose the protection function.

FIG. 2 is a schematic diagram of one specific example of the channel shared ring network protection in the prior art. The channel shared ring network protection group shown in the figure consists of eight nodes, marked as A, B . . . H, respectively. A pair of services present between the node H and the node F, and a pair of services present between the node F and the node E. After a span 4 fails, the services between the node H and the node F are transmitted via a protection path thereof (the broken line in the figure represents the protection path of service), i.e., going through the node H, the node A . . . until the node F, while the services between the node F and the node E will not be affected. However after a span 5 also fails, since both the working path and the protection path of the services between the node H and the node F fail, the service will be in a state of interrupted service, and meanwhile, the services between the node F and the node E will also lose the protection function.

SUMMARY OF THE INVENTION

The present invention is proposed considering the problem that the ring network protection function becomes invalid in a case of a multi-span failure existing in the prior art, thus the main object of the present invention lies in providing a method for implementing permanent ring network protection in an MESH network so as to solve the above problem.

In order to achieve the above object, a method for implementing permanent ring network protection in an MESH network is provided according to one aspect of the present invention.

The method for implementing permanent ring network protection in an MESH network according to the present invention comprises the following steps:

A: a node in a ring network protection group informing, when detecting a certain span fails, other nodes in the ring network protection group of failure information;

B: each node in the ring network protection group switching a service that is affected by the failure to a protection path thereof for transmission; and C: searching for a substitute path for the failed span in idle resources of the MESH network, establishing a new ring network protection group by using the substitute path and sections that are not affected by the failure in the ring network protection group, and switching the service that is affected by the failure from being transmitted via the protection path to being transmitted via the substitute path.

Preferably, a following step is also comprised prior to the step A:

A1: determining a service distribution and a topological structure of the ring network protection group, and setting protection group configuration information for each node in the ring network protection group.

Preferably, in the step B, a manner in which each node in the ring network protection group switches the service that is affected by the failure to the protection path thereof for transmission comprises a multiplex section shared ring network protection manner, a channel shared ring network protection manner or a sub-wavelength shared ring network protection manner.

Preferably, in the step C, it also comprises, after the new ring network protection group is established, a step of updating the protection group configuration information of the each node in the ring network protection group.

Preferably, a source node of the substitute path is the same as a source node of the failed span, a sink node of the substitute node is the same as a sink node of the failed span, and the substitute path should not comprise any other nodes in the ring network protection group.

Preferably, it also comprises, after the step C, a step of marking resources occupied by a section of the failed span in the original ring network protection group to be in an "idle" state.

With the method in the present invention, after a certain span fails in the ring network, a quick ring network protection can be provided to the service that is affected, meanwhile, a new substitute path can be determined for the affected service so as to establish a new ring network protection group, and the new established ring network protection group is capable of continuing to process a new span failure. The method provided in the present invention solves the problem that the ring network protection function becomes invalid in a case of the multi-span failure in the traditional ring network protection technologies, is capable of providing the permanent ring network protection function to all the services on the ring network, and at the same time can assure quick switching.

Other characteristics and advantages of the present invention will be explained in and partially become obvious from the following Description, or understood by implementing the invention. The object and other advantages of the present invention can be realized and obtained via the structures specially indicated in the Description, Claims and accompanying drawings.

BRIEF DESCRIPTION OF THE DRAWINGS

The drawings illustrated here provide a further understanding of the present invention and form a part of the present application. The exemplary examples and the description thereof in the present invention are used to explain the invention without unduly limiting the invention, wherein.

DETAILED DESCRIPTION OF EMBODIMENTS

Function Overview

The technical solution provided by the present invention is: after a certain span fails in a ring network protection group, a new ring network protection group is established by determining a new substitute path for an affected service, to enable the newly established ring network protection group to continue to process a new span failure, so as to provide a quick and permanent ring network protection function to all the services on the original ring network protection group.

The present invention will be illustrated in detail with reference to the accompanying drawings in conjunction with embodiments hereinafter. It should be indicated that the embodiments and features therein of the present application can be combined if they are not conflicted.

Method Embodiments

Figure 1:
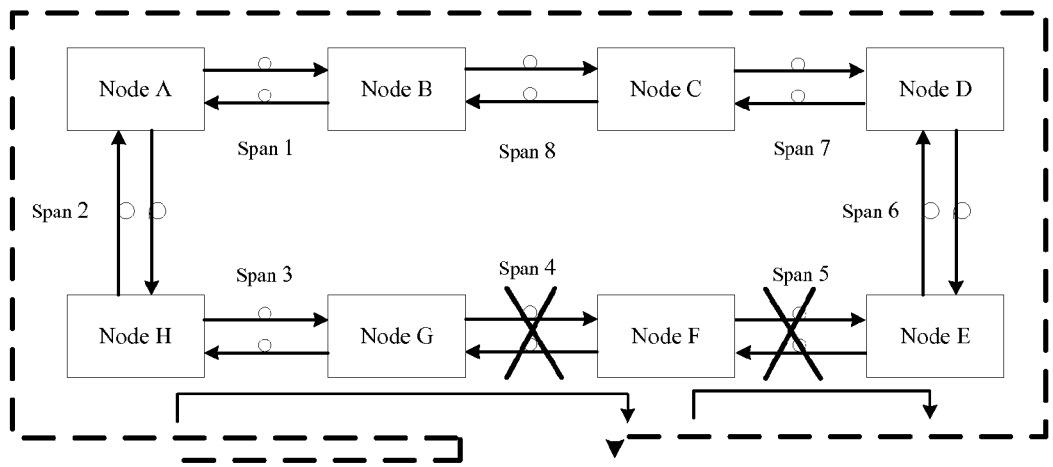
FIG. 1 is a schematic diagram of one specific example of a multiplex section shared ring network protection in the prior art.
Figure 2:
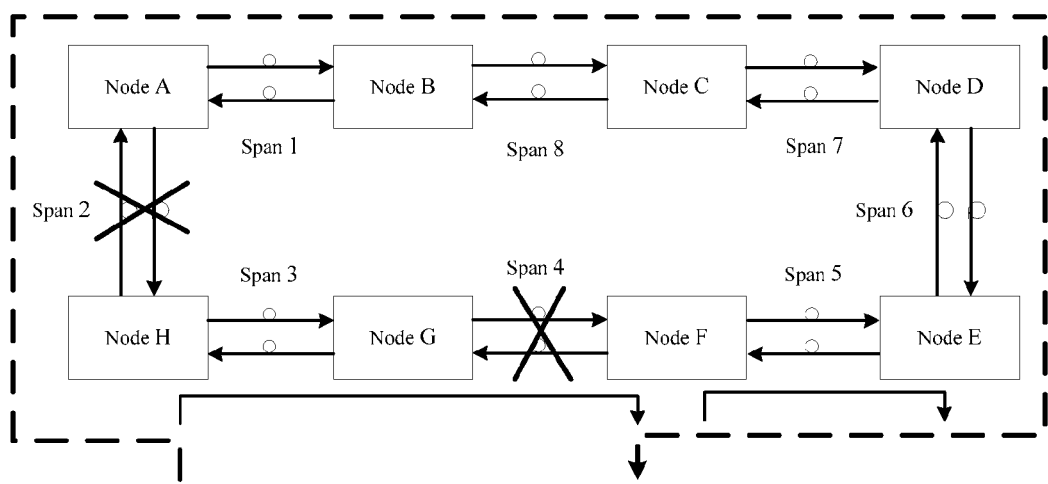
FIG. 2 is a schematic diagram of one specific example of a channel shared ring network protection in the prior art.
Figure 3:
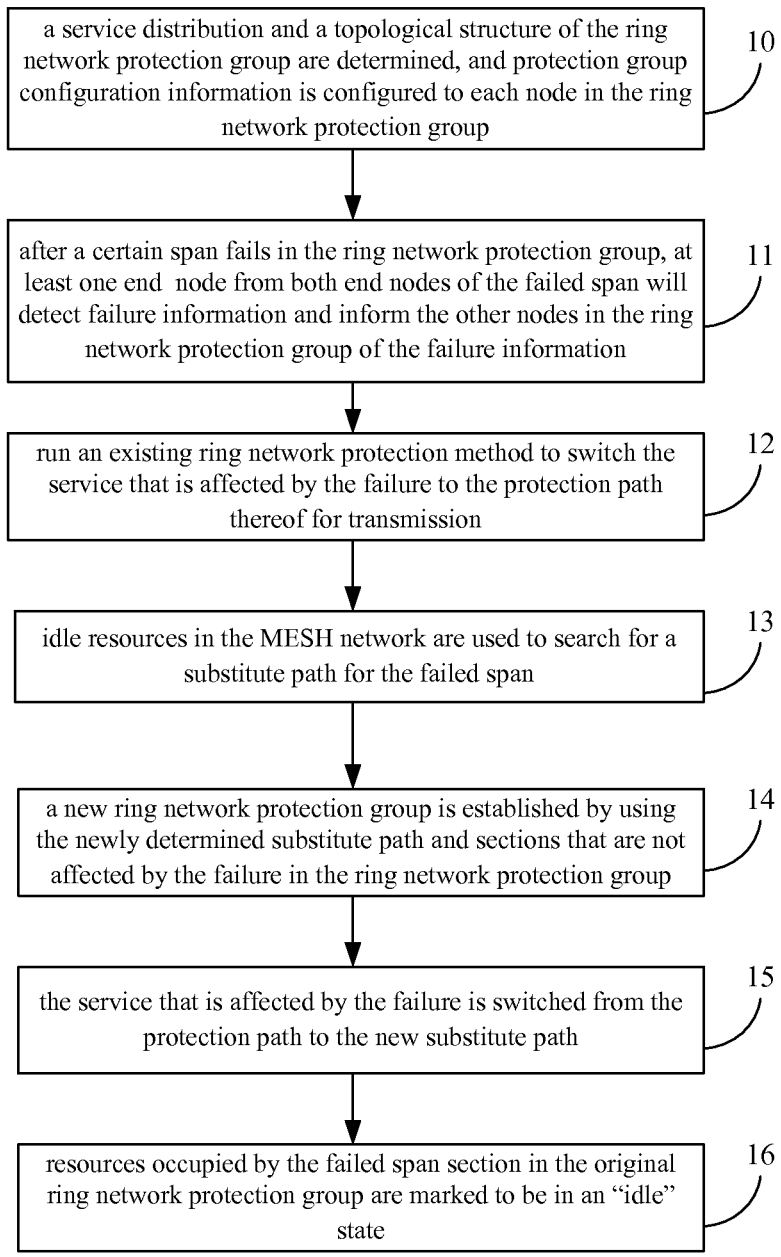
FIG. 3 is a flow diagram of a principle for realizing a method for implementing permanent ring network protection in an MESH network according to the present invention.
Figure 4:
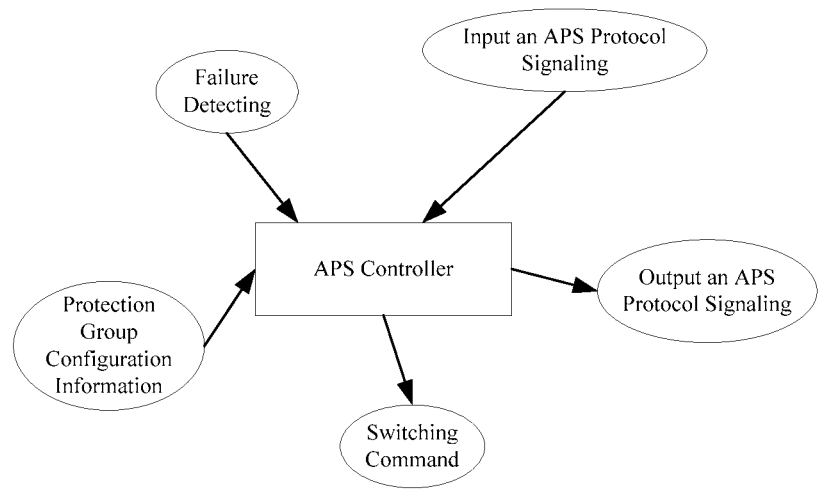
FIG. 4 is a model of information input and output by an APS controller in a node in a ring network protection group.

FIG. 3 is a flow diagram of a principle for realizing a method for implementing permanent ring network protection in an MESH network according to the present invention, and FIG. 4 is a model of information input and output by an APS controller of a node in a ring network protection group. As shown in FIG. 3 and FIG. 4, the method for implementing the permanent ring network protection in the MESH network according to the present invention mainly comprises step 10 to step 16 as follow.

Step 10: a service distribution and a topological structure of the ring network protection group are determined, and protection group configuration information is configured to an APS controller of each node in the ring network protection group.

Step 11: after a certain span fails in the ring network protection group, failure detecting unit of at least one end node of both end nodes of the failed span detects failure information and informs the APS controller of the current node, and the APS controller informs APS controllers of other nodes in the ring network protection group of the detected failure information.

Step 12: the APS controllers of respective nodes in the ring network protection group run an existing ring network protection method (including, but not limited to, a multiplex section shared ring network protection, a channel shared ring network protection or a sub-wavelength shared ring network protection), and interact via protocol signaling(s) between the nodes to switch the service affected by the failure to the protection path thereof for transmission.

Step 13: idle resources in the MESH network are used to search for a substitute path for the failed span, wherein the substitute path is required to have a same source node as the failed span, the substitute path is required to have a same sink node as the failed span, and not to include any other nodes in the ring network protection group.

In the above, the substitute path can be searched for in a centralized mode or in a distributed mode, and the specific method can be, but not limited to, an existing constraint-based rerouting algorithm, etc.

Step 14: a new ring network protection group is established by using the newly determined substitute path and sections that are not affected by the failure in the ring network protection group, and the protection group configuration information of each node is updated in the newly established ring network protection group.

Step 15: the service affected by the failure is switched from the protection path to the new substitute path, thus, the new ring network protection group will have no failed span and can provide protection to all ring network services.

Step 16: resources occupied by the failed span section above in the original ring network protection group are marked to be in an "idle" state, to enable the same to be subsequently used for the protection paths of other failures in the MESH network.

The implementing process of the present invention will be further illustrated in detail by two specific examples hereinafter.

Embodiment 1

Figure 5A:
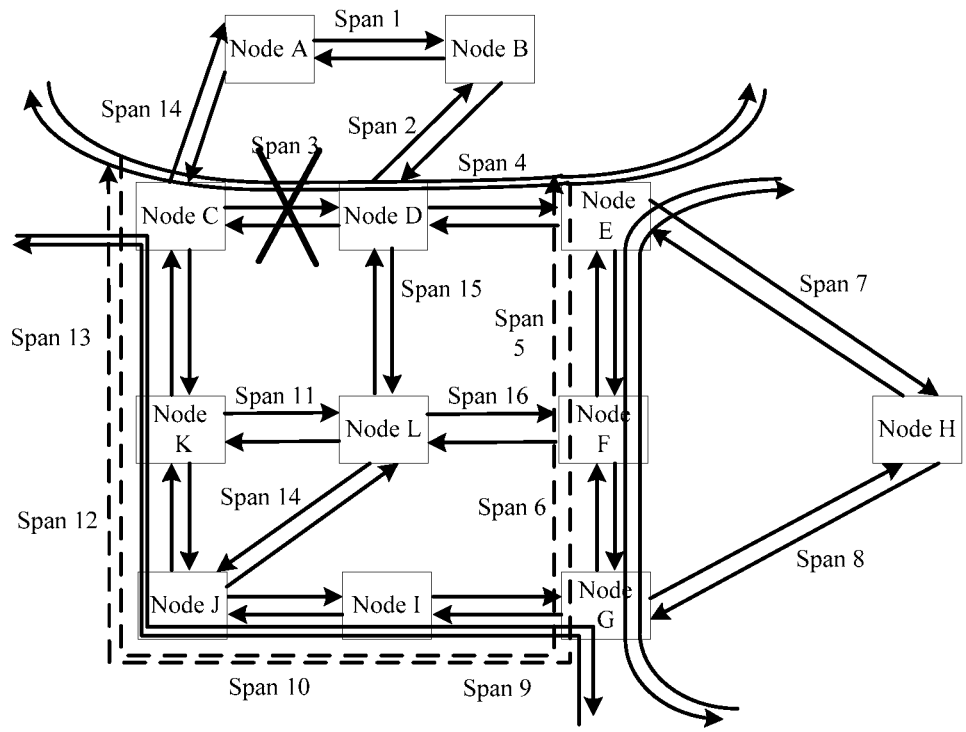
FIG. 5A and FIG. 5B are schematic diagrams of processing failed spans in a case of a channel shared ring network protection according to Embodiment 1 of the present invention.
Figure 5B:
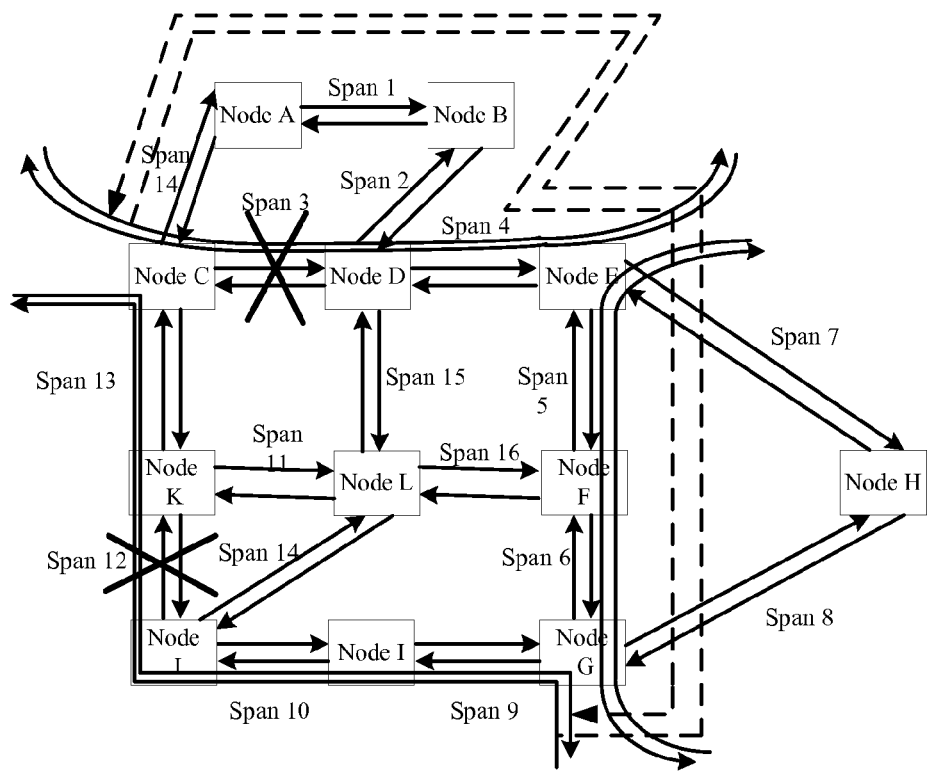

FIG. 5A and FIG. 5B are schematic diagrams of processing failed spans in a case of a channel shared ring network protection according to Embodiment 1 of the present invention. In the present embodiment, a topological structure of a ring network protection group in a network structure shown in FIG. 5A and FIG. 5B should be firstly determined and a service configuration is performed to the determined ring network protection group. Node C, node D, node E, node F, node G, node I, node J and node K establish a channel shared ring network protection group, wherein a pair of services (entitled as service 1) present between the node C and the node E and passes through the node D; a pair of services (entitled as service 2) present between the node E and the node G and passes through the node F; and a pair of services (entitled as service 3) present between the node G and the node C and passes through the node I, the node J and the node K.

After span 3 in FIG. 5A fails, processing the failure of the span 3 in the present embodiment specifically comprises step 20 to step 25 as follow.

Step 20: after the span 3 fails, a failure detecting unit in the node C and a failure detecting unit in the node E detect the failure and report the same to APS controllers of respective nodes, and the APS controller of the node C and the APS controller of the node E inform the APS controllers of other nodes in the ring network protection group of the detected failure information.

Step 21: the APS controllers of respective nodes in the ring network protection group run an existing channel shared ring network protection protocol algorithm, and interact via a protocol signaling between the nodes to provide protection to the service 1 that the service 1 is to be transmitted via a protection path thereof (a path formed by the node C, the node K, the node J, the node I, the node G, the node F and the node E), as shown by broken lines in FIG. 5A.

Step 22: idle resources in the whole MESH network are used to search for a substitute path for the failed span 3, wherein in the present embodiment the substitute path is required to take the node C as the source node, to take the node D as the sink node, and should no longer include any other nodes besides the node C in the original ring network protection group. It can be seen from FIG. 5A that the failed span has one substitute span, i.e., the path formed by the node C, the node A, the node B and the node D.

Step 23: a new ring network protection group is established by using the substitute path determined in the step 22 and sections that are not affected by the failure in the ring network protection group, comprising the node C, the node A, the node B, the node D, the node E, the node F, the node G, the node I, the node J and the node K, and meanwhile, protection group configuration information of respective nodes is updated in the newly established ring network protection group.

Step 24: the service 1 that is affected by the failure is switched from being transmitted via the protection path to being transmitted via the substitute path, i.e., the service 1 is transmitted via a path formed by the node C, the node A, the node B, the node D and the node E, thus, the new ring network protection group will have no failed span and can provide protection to all the ring network services.

Step 25: resources of the span 3 are marked to be in an "idle" state, to enable them to be subsequently used for the protection paths of other failures in the network.

When a span 12 fails in the newly established ring network protection group above (comprising the node C, the node A, the node B, the node D, the node E, the node F, the node G, the node I, the node J and the node K), as shown in FIG. 5B, processing the failure of the span 12 in the present embodiment specifically comprises step 30 to step 35 as follows.

Step 30: after the span 12 fails, a failure detecting unit in the node J and a failure detecting unit in the node K detect the failure and report the same to APS controllers of respective nodes, and the APS controller of the node J and the APS controller of node K inform the APS controllers of other nodes in the newly established ring network protection group of the detected failure information.

Step 31: the APS controllers of respective nodes in the ring network protection group run an existing channel shared ring network protection protocol algorithm, and interact via a protocol signaling between the nodes to provide protection to the service 3 that the service 3 is to be transmitted via a protection path thereof (a path formed by the node C, the node A, the node B, the node D, the node E, the node F and the node G), as shown by broken lines in FIG. 5B.

Step 32: the idle resources in the whole MESH network are used to search for a substitute path for the failed span 12, wherein the substitute path is required to take the node K as the source node, to take the node J as the sink node, and should no longer comprise any other nodes besides the node K and node J in the ring network protection group. As shown in FIG. 5B, the failed span 12 has one substitute span, i.e., the path formed by the node K, the node L and the node J.

Step 33: a new ring network protection group is established again by using the substitute path determined in the step 32 and sections that are not affected by the failure in the ring network protection group, comprising the node C, the node A, the node B, the node D, the node E, the node F, the node G, the node I, the node J, the node L and the node K, and meanwhile, the protection group configuration information of respective nodes is updated in the newly established ring network protection group.

Step 34: the service 3 that is affected by the failure is switched from being transmitted via the protection path to being transmitted via the substitute path, i.e., the service 3 is transmitted via the node C, the node K, the node L, the node J, the node I and the node G, thus, the ring network protection group newly established in this time will have no failed span and can provide protection to all the ring network services.

Step 35: resources of the span 12 are marked to be in an "idle" state, to enable them to be subsequently used for the protection paths of other failures in the network.

Embodiment 2

Figure 6A:
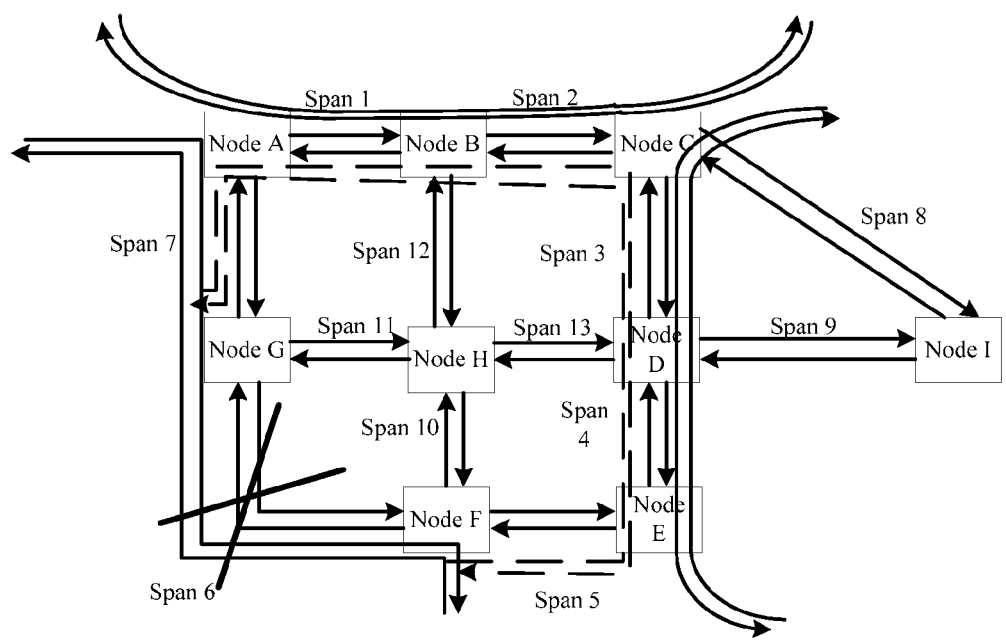
FIG. 6A and FIG. 6B are schematic diagrams of processing failed spans in a case of a multiplex section shared ring network protection according to Embodiment 2 of the present invention.
Figure 6B:
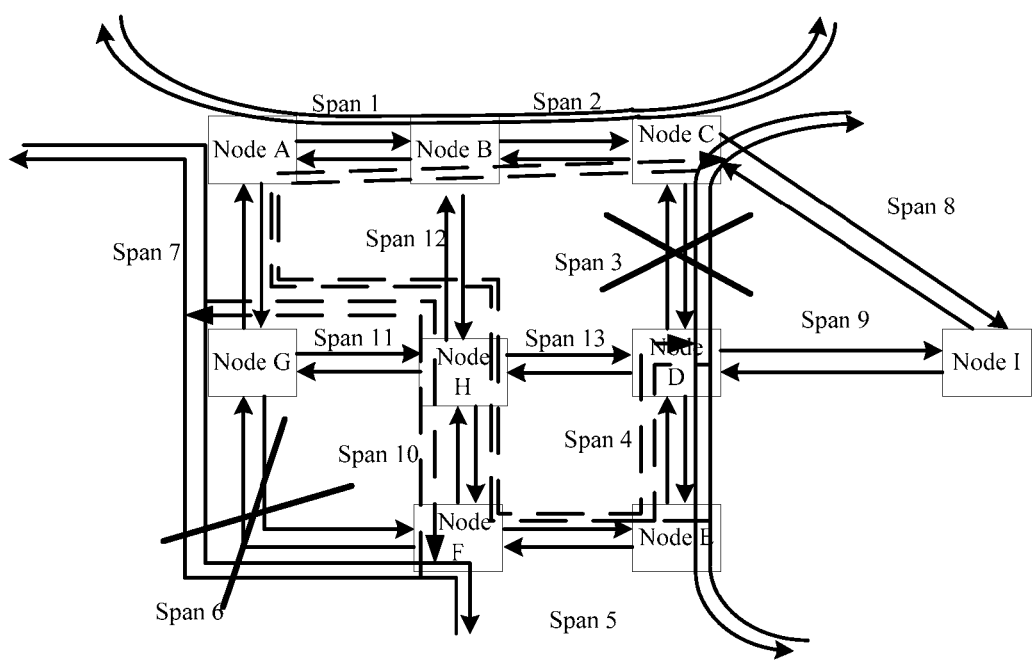

FIG. 6A and FIG. 6B are schematic diagrams of processing failed spans in a case of the multiplex section shared ring network protection according to Embodiment 2 of the present invention. In the present embodiment, a topological structure of a ring network protection group in a network structure shown in FIG. 6A and FIG. 6B should be firstly determined and a service configuration is performed for the determined ring network protection group. Node A, node B, node C, node D, node E, node F and node G form a multiplex section shared ring network protection, wherein a pair of services (entitled as service 1) present between the node A and the node C and passes through the node B; a pair of services (entitled as service 2) present between the node C and the node E and passes through the node D; and a pair of services (entitled as service 3) present between the node F and the node A and passes through the node G.

After span 6 in FIG. 6A fails, processing the failure of the span 6 in the present embodiment specifically comprises step 40 to step 45 as follows.

Step 40: after the span 6 fails, a failure detecting unit in the node F and a failure detecting unit in the node G detect the failure and report the same to APS controllers of respective nodes, and the APS controller of the node F and the APS controller of the node G inform the APS controllers of other nodes in the newly established ring network protection group of the detected failure information.

Step 41: the APS controllers of respective nodes in the ring network protection group run an existing multiplex section shared ring network protection protocol algorithm, and interact via a protocol signaling between the nodes to provide protection to the service 3 that the service 3 is to be transmitted via a protection path thereof (the node F, the node E, the node D, the node C, the node B, the node A, the node G, again to the node A), as shown by broken lines in FIG. 6A.

Step 42: idle resources in the whole MESH network are used to search for a substitute path for the failed span 6, wherein the substitute path is required to take the node F as the source node and to take the node G as the sink node, and should no longer comprise any other nodes besides the node F and the node G in the original ring network protection group. As shown in FIG. 6A, the failed span has one substitute span, i.e., the path formed by the node F, the node H and the node G.

Step 43: a new ring network protection group is established by using the substitute path determined in the step 42 and sections that are not affected by the failure in the ring network protection group, comprising the node A, the node B, the node C, the node D, the node E, the node F, the node H and the node G, and meanwhile, protection group configuration information of respective nodes is updated in the newly established ring network protection group.

Step 44: the service 3 that is affected by the failure is switched from being transmitted via the protection path to being transmitted via the substitute path (passing through the node F, the node H, and the node G), thus, the new ring network protection group will have no failed span and can provide protection to all the ring network services.

Step 45: resources of the span 6 are marked to be in an "idle" state, to enable them to be subsequently used for the protection paths of other failures in the network.

When span 3 fails in the newly established ring network protection group above (comprising the node A, the node B, the node C, the node D, the node E, the node F, the node H and the node G), as shown in FIG. 6B, processing the failure of the span 3 in the present embodiment specifically comprises step 50 to step 55 as follow.

Step 50: after the span 3 fails, a failure detecting unit in the node C and a failure detecting unit in the node D detect the failure and report the same to APS controllers of respective nodes, and the APS controller of the node C and the APS controller of the node D inform the APS controllers of other nodes in the newly established ring network protection group of the detected failure information.

Step 51: the APS controllers of respective nodes in the ring network protection group run an existing multiplex section shared ring network protection protocol algorithm, and interact via a protocol signaling between the nodes to provide protection to the service 2 that the service 2 is to be transmitted via a protection path thereof (the node C, the node B, the node A, the node G, the node H, the node F, the node E, the node D, and again to the node E), as shown by broken lines in FIG. 6B.

Step 52: the idle resources in the whole MESH network are used to search for a substitute path for the failed span 3, wherein the substitute path is required to take the node C as the source node and to take the node D as the sink node, and should no longer comprise any other nodes besides the node C and the node D in the original ring network protection group. As shown in FIG. 6B, the failed span 3 has one substitute span, i.e., the path formed by the node C, the node I and the node D.

Step 53: a new ring network protection group is established by using the substitute path determined in the step 52 and sections that are not affected by the failure in the ring network protection group, comprising the node A, the node B, the node C, the node I, the node D, the node E, the node F, the node H and the node G, and meanwhile, the protection group configuration information of respective nodes is updated in the ring network protection group.

Step 54: the service 2 that is affected by the failure is switched from being transmitted via the protection path to being transmitted via the substitute path (comprising the node C, the node I and the node D), thus, the new ring network protection group will have no failed span and can provide protection to all the ring network services.

Step 55: resources of the span 3 are marked to be in an "idle" state, to enable them to be subsequently used for the protection paths of other failures in the network.

According to the descriptions above, the method for implementing the permanent ring network protection in the MESH network provided by the present invention is capable of providing the permanent ring network protection function to all services on the ring network.

A computer-readable medium is also provided according to an embodiment of the present invention. The computer-readable medium is stored with computer-executable instructions. When the instructions are executed by a computer or a processor, the computer or the processor is enabled to execute the processing in the step 10 to the step 16 as shown in FIG. 3. Preferably, one or more in respective embodiments above can be executed.

Besides, the present invention is implemented without modifying the system architecture or current processing flow, is easy to be realized and popularized in the technical field, and has a strong industry application.

The above mentioned is merely the preferred embodiments of the present invention but not to limit the present invention. Various alterations and changes to the present invention are apparent to the person skilled in the art. Any modifications, equivalent substitutions, improvements etc. within the spirit and principle of the present invention should be concluded in the scope protected by the present invention.

What is claimed is:

1. A method for implementing permanent ring network protection in an MESH network, comprising steps of:
   A. a node in a ring network protection group informing, when detecting that a certain span fails, other nodes in the ring network protection group of failure information;
   B. each node in the ring network protection group switching a service that is affected by the failure to a protection path thereof for transmission;
   C. searching for a substitute path for the failed span in idle resources of the MESH network, establishing a new ring network protection group by using the substitute path and sections that are not affected by the failure in the ring network protection group, and switching the service that is affected by the failure from being transmitted via the protection path to being transmitted via the substitute path; and
   D. marking resources occupied by a section of the failed span in the original ring network protection group to be in an "idle" state.

2. The method according to claim 1, wherein a following step is also comprised prior to the step A:
   A1. determining a service distribution and a topological structure of the ring network protection group, and setting protection group configuration information for each node in the ring network protection group.

3. The method according to claim 1, wherein in the step B the ring network protection group comprises multiplex section shared ring network protection, channel shared ring network protection or sub-wavelength shared ring network protection.

4. The method according to claim 1, wherein in the step C, it also comprises, after the new ring network protection group is established, a step of updating the protection group configuration information of the each node in the ring network protection group.

5. The method according to claim 1, wherein a source node of the substitute path is the same as a source node of the failed span, a sink node of the substitute path is the same as a sink node of the failed span, and the substitute path does not contain any other nodes in the ring network protection group.

* * * * *